(12) United States Patent
Furr

(10) Patent No.: US 12,468,718 B1
(45) Date of Patent: Nov. 11, 2025

(54) INTEGRATED MULTI-CHANNEL CONVERSATIONAL UTILITY

(71) Applicant: Bank of America Corporation, Charlotte, NC (US)

(72) Inventor: Hannah Furr, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 18/965,664

(22) Filed: Dec. 2, 2024

(51) Int. Cl.
*G06F 16/20* (2019.01)
*G06F 16/2457* (2019.01)
*G06F 16/9538* (2019.01)

(52) U.S. Cl.
CPC .... *G06F 16/24578* (2019.01); *G06F 16/9538* (2019.01)

(58) Field of Classification Search
None
See application file for complete search history.

(56) References Cited

U.S. PATENT DOCUMENTS

2022/0067458 A1* 3/2022 Wang ............... G06F 18/2113

* cited by examiner

*Primary Examiner* — Belix M Ortiz Ditren
(74) *Attorney, Agent, or Firm* — Weiss & Arons LLP

(57) ABSTRACT

Systems and methods for an integrated, multi-channel, conversational utility are provided. Methods include providing a single search icon on a user device accessing an online portal. Methods include receiving a conversational input inquiry and, via a specially trained ML model, generating a first set of results including at least one general information resource result and at least one user-specific information result. When the first set of results exceeds a threshold confidence score, methods include displaying the first set of results as a response to the input inquiry. When the confidence score fails to exceed the threshold score, methods include generating a conversational follow-up question designed to clarify the intent of the input inquiry, receiving a response to the follow-up question, generating a second set of results and, when the second set of results exceeds the threshold confidence score, displaying the second set of results as the input inquiry response.

20 Claims, 5 Drawing Sheets

INTEGRATED MULTI-CHANNEL CONVERSATIONAL UTILITY

FIELD OF TECHNOLOGY

Aspects of the disclosure relate to computer systems. Specifically, aspects of the disclosure relate to improved conversational utilities.

BACKGROUND OF THE DISCLOSURE

The rapid advancement of artificial intelligence (AI) and machine learning (ML) has enabled the development of conversational chatbots capable of simulating human-like interactions across various applications. These systems have found utility in customer support and virtual assistance across disparate fields such as healthcare, education, entertainment, and the financial sector.

Conversational chatbots leverage natural language processing (NLP) and ML techniques, particularly neural networks, to understand user inputs, generate coherent responses, and engage in meaningful dialogues.

Despite significant progress, existing chatbot technologies often face challenges in delivering high-quality and accurate responses. Moreover, many user-facing digital resources provide multiple channels for user assistance, leading to inefficiency and user frustration and confusion.

It would be desirable, therefore, to provide systems and methods for a conversational utility that provides increased accuracy and integration across multiple information sources.

SUMMARY OF THE DISCLOSURE

Aspects of the disclosure relate to integrated, multi-channel, conversational utilities. The utility may include a processor and computer-executed instructions. The utility may be configured to train a machine-learning (ML) model to associate input keywords with a set of result options. The set of result options may include results across at least two separate information sources housed within an entity hosting the utility, and the at least two separate information sources may include a general information center and a user-specific information center.

The utility may be configured to provide a single search icon on a display of a remote device of a user accessing an online portal of the entity and receive, via the single search icon, a conversational input inquiry.

The utility may be configured to generate, via the ML model, a first set of results comprising at least one general information resource result and at least one user-specific information result, and a confidence score of a relevance of the first set of results to the input inquiry.

When the confidence score exceeds a predetermined threshold score, the utility may be configured to display the first set of results on the display of the remote device as a response to the input inquiry.

When the confidence score fails to exceed the predetermined threshold score, the utility may be configured to generate, via the ML model, a conversational follow-up question designed to clarify an intent of the input inquiry, display the follow-up question on the display of the remote device, and receive a conversational input response to the follow-up question. The utility may be configured to generate, via the ML model, and based on the input inquiry and the input response, a second set of results comprising at least one general information resource result and at least one user-specific information result, and a second confidence score of a relevance of the second set of results to the input inquiry. When the second confidence score exceeds the predetermined threshold score, the utility may be configured to display the second set of results on the display of the remote device as the response to the input inquiry.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION OF THE DISCLOSURE

Figure 1:
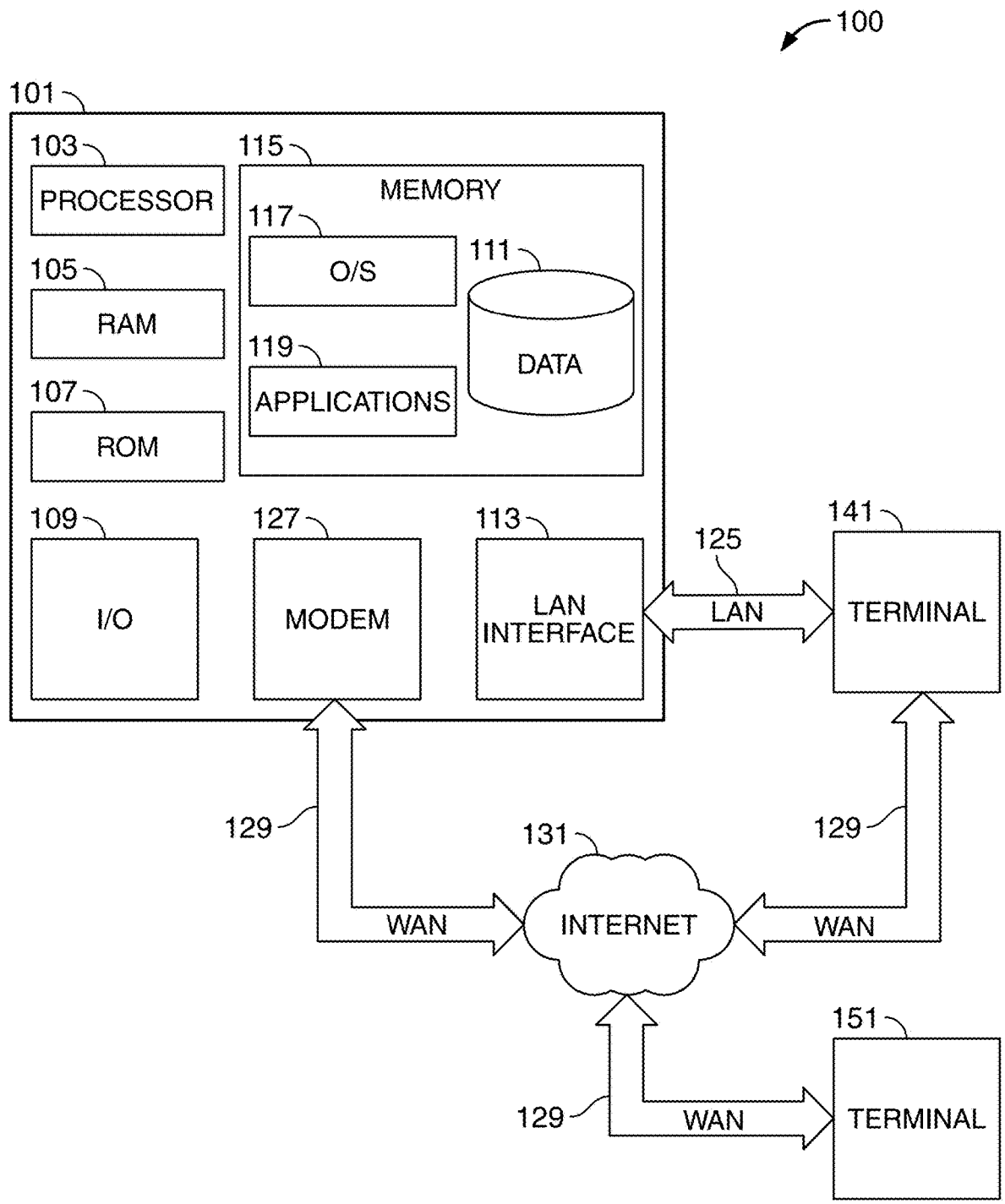
FIG. 1 shows an illustrative system in accordance with principles of the disclosure.

Aspects of the disclosure relate to systems and methods for integrated, multi-channel, conversational utilities. System (which may be referred to herein as the "utility" or "utilities") features and configurations may, in certain embodiments, correspond to steps of the methods. The utility may include a processor and computer-executed instructions. The utility may be configured to train a machine-learning (ML) model to associate input keywords with a set of result options. The set of result options may include results across at least two separate information sources housed within an entity hosting the utility. The at least two separate information sources may include a general information center and a user-specific information center.

A general information center may, for example, include a database of informational articles. The informational articles may be designed to provide overviews, or summaries, of certain topics. The informational articles may be designed to provide general responses to queries about certain topics. For example, in the context of a financial institution, the topics may include information about certain accounts, payments, transfers, profiles, instruments, or areas of a website. The topics may also include general inquiries, and the informational articles may include general step-by-step instructions that address the inquiries. For example, an inquiry may include "how do I initiate an account transfer" and the informational article may set forth general steps for initiating an account transfer.

A user-specific information center may include information specific to a user. This information center may, for example, include profile and account information of specific users.

The utility may be configured to provide a single search icon on a display of a remote device of a user accessing an online portal of the entity. The utility may be configured to receive, via the single search icon, a conversational input inquiry.

The utility may be configured to generate, via the ML model, a first set of results comprising at least one general information resource result and at least one user-specific information result. The utility may also be configured to generate, via the ML model, a confidence score of a relevance of the first set of results to the input inquiry. The score may, for example, be a number from 0 to 1, wherein the closer the number is to 1, the result is statistically more likely to be accurate and relevant.

When the confidence score exceeds a predetermined threshold score, the utility may be configured to display the first set of results on the display of the remote device as a response to the input inquiry.

When the confidence score fails to exceed the predetermined threshold score, the utility may be configured to generate, via the ML model, a conversational follow-up question designed to clarify an intent of the input inquiry. The utility may also be configured to display the follow-up question on the display of the remote device. The utility may also be configured to receive a conversational input response to the follow-up question.

The utility may be configured to generate, via the ML model, and based on the input inquiry and the input response, a second set of results comprising at least one general information resource result and at least one user-specific information result. The utility may also be configured to generate a second confidence score of a relevance of the second set of results to the input inquiry. When the second confidence score exceeds the predetermined threshold score, the utility may be configured to display the second set of results on the display of the remote device as the response to the input inquiry.

In some embodiments, when the second confidence score fails to exceed the predetermined threshold score, the utility may be configured to repeatedly generate follow-up questions and receive input responses until a set of results is generated with a confidence score that exceeds the predetermined threshold score. In certain embodiments, when the cycle reaches a predetermined limit, the system may be configured to display the set of results with the highest confidence score and/or display an error message.

In certain embodiments, the ML model may be configured to generate the sets of results based on the conversational input inquiry and also based on contextual information. The contextual information may, in certain embodiments, include historical inquiries of the user, current and former user activity in the portal, biographical information of the user, and/or real time current events accessed from an online source. The real time current events may, for example, be accessed by the system in real time from one or more predetermined news websites or social media sites, or an AI-directed scrape of a variety of online sources or the entire internet.

In some embodiments, the conversational input inquiry may be text-based. A text-based conversational input inquiry may, for example, include a query typed by a user in a text chatbot or search field. In some embodiments, the conversational input inquiry may be voice-based. A voice-based conversational input inquiry may, for example, be spoken by the user on a phone call or through a conversational assistant accessed via the integrated help/search icon (i.e., the single search icon) on the display of the user device.

In some embodiments, the single search icon may only be provided after the user has achieved authenticated access (e.g., via password, passcode, biometric, trusted system certificate, or any other suitable authentication process) to the portal. In some embodiments, the single search icon may appear on the display both before and after authenticated access (and may even appear identical), but the single search icon may be augmented with increased functionality after authenticated access. For example, before authenticated access the single search icon may only return general results, and after authenticated access, the single search icon may return the full result set including at least one general information resource result and at least one user-specific information result. In some embodiments, for example, the system may only generate general results prior to authenticated access. In other embodiments, the system may generate the full result set but may withhold user-specific results prior to achieving authenticated access.

In certain embodiments, the response to the input inquiry may be automatically displayed on the display of the remote device in an optimized format based on a type of information included in the response. The optimized format, for example, may be selected from a list of formats comprising at least tables, text, video, audio, and images. For example, when the response includes data that changed over time, the optimized format may include a graph. When the response includes a step by step process, the optimized format may include a video and/or images showing and describing the process.

In some embodiments, the utility may be configured to generate, prior to receiving the input inquiry, typeahead suggestions for pre-submission textual input of the user. The typeahead suggestions may be generated upon receiving partial textual input at the remote device prior to submission of the input inquiry. The typeahead suggestions may be displayed on the display of the remote device, and may be configured so the user can capture the typeahead suggestion to complete, and thereafter submit, the input inquiry. The typeahead suggestions may be designed to clarify the intent of the input inquiry.

Apparatus and methods described herein are illustrative. Apparatus and methods in accordance with this disclosure will now be described in connection with the figures, which form a part hereof. The figures show illustrative features of apparatus and method steps in accordance with the principles of this disclosure. It is understood that other embodiments may be utilized, and that structural, functional, and procedural modifications may be made without departing from the scope and spirit of the present disclosure.

FIG. 1 shows an illustrative block diagram of system 100 that includes computer 101. Computer 101 may alternatively be referred to herein as a "server" or a "computing device." Computer 101 may be a workstation, desktop, laptop, tablet, smart phone, or any other suitable computing device. Elements of system 100, including computer 101, may be used to implement various aspects of the systems and methods disclosed herein.

Computer 101 may have a processor 103 for controlling the operation of the device and its associated components, and may include RAM 105, ROM 107, input/output module 109, and a memory 115. The processor 103 may also execute all software running on the computer—e.g., the operating system and/or voice recognition software. Other components commonly used for computers, such as EEPROM or Flash memory or any other suitable components, may also be part of the computer 101.

The memory 115 may comprise any suitable permanent storage technology—e.g., a hard drive. The memory 115 may store software including the operating system 117 and application(s) 119 along with any data 111 needed for the operation of the system 100. Memory 115 may also store videos, text, and/or audio assistance files. The videos, text, and/or audio assistance files may also be stored in cache memory, or any other suitable memory. Alternatively, some or all of computer executable instructions (alternatively referred to as "code") may be embodied in hardware or firmware (not shown). The computer 101 may execute the instructions embodied by the software to perform various functions.

Input/output ("I/O") module may include connectivity to a microphone, keyboard, touch screen, mouse, and/or stylus through which a user of computer 101 may provide input. The input may include input relating to cursor movement. The input may relate to conversational utilities. The input/output module may also include one or more speakers for providing audio output and a video display device for providing textual, audio, audiovisual, and/or graphical output. The input and output may be related to computer application functionality. The input and output may be related to conversational utilities.

System 100 may be connected to other systems via a local area network (LAN) interface 113.

System 100 may operate in a networked environment supporting connections to one or more remote computers, such as terminals 141 and 151. Terminals 141 and 151 may be personal computers or servers that include many or all of the elements described above relative to system 100. The network connections depicted in FIG. 1 include a local area network (LAN) 125 and a wide area network (WAN) 129, but may also include other networks. When used in a LAN networking environment, computer 101 is connected to LAN 125 through a LAN interface or adapter 113. When used in a WAN networking environment, computer 101 may include a modem 127 or other means for establishing communications over WAN 129, such as Internet 131.

It will be appreciated that the network connections shown are illustrative and other means of establishing a communications link between computers may be used. The existence of various well-known protocols such as TCP/IP, Ethernet, FTP, HTTP and the like is presumed, and the system can be operated in a client-server configuration to permit a user to retrieve web pages from a web-based server. The web-based server may transmit data to any other suitable computer system. The web-based server may also send computer-readable instructions, together with the data, to any suitable computer system. The computer-readable instructions may be to store the data in cache memory, the hard drive, secondary memory, or any other suitable memory.

Additionally, application program(s) 119, which may be used by computer 101, may include computer executable instructions for invoking user functionality related to communication, such as e-mail, Short Message Service (SMS), and voice input and speech recognition applications. Application program(s) 119 (which may be alternatively referred to herein as "plugins," "applications," or "apps") may include computer executable instructions for invoking user functionality related to performing various tasks. The various tasks may be related to conversational utilities.

Computer 101 and/or terminals 141 and 151 may also be devices including various other components, such as a battery, speaker, and/or antennas (not shown).

Terminal 151 and/or terminal 141 may be portable devices such as a laptop, cell phone, Blackberry™, tablet, smartphone, or any other suitable device for receiving, storing, transmitting and/or displaying relevant information. Terminals 151 and/or terminal 141 may be other devices. These devices may be identical to system 100 or different. The differences may be related to hardware components and/or software components.

Any information described above in connection with database 111, and any other suitable information, may be stored in memory 115. One or more of applications 119 may include one or more algorithms that may be used to implement features of the disclosure, and/or any other suitable tasks.

The invention may be operational with numerous other general purpose or special purpose computing system environments or configurations. Examples of well-known computing systems, environments, and/or configurations that may be suitable for use with the invention include, but are not limited to, personal computers, server computers, hand-held or laptop devices, tablets, mobile phones, smart phones and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc., that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

Figure 2:
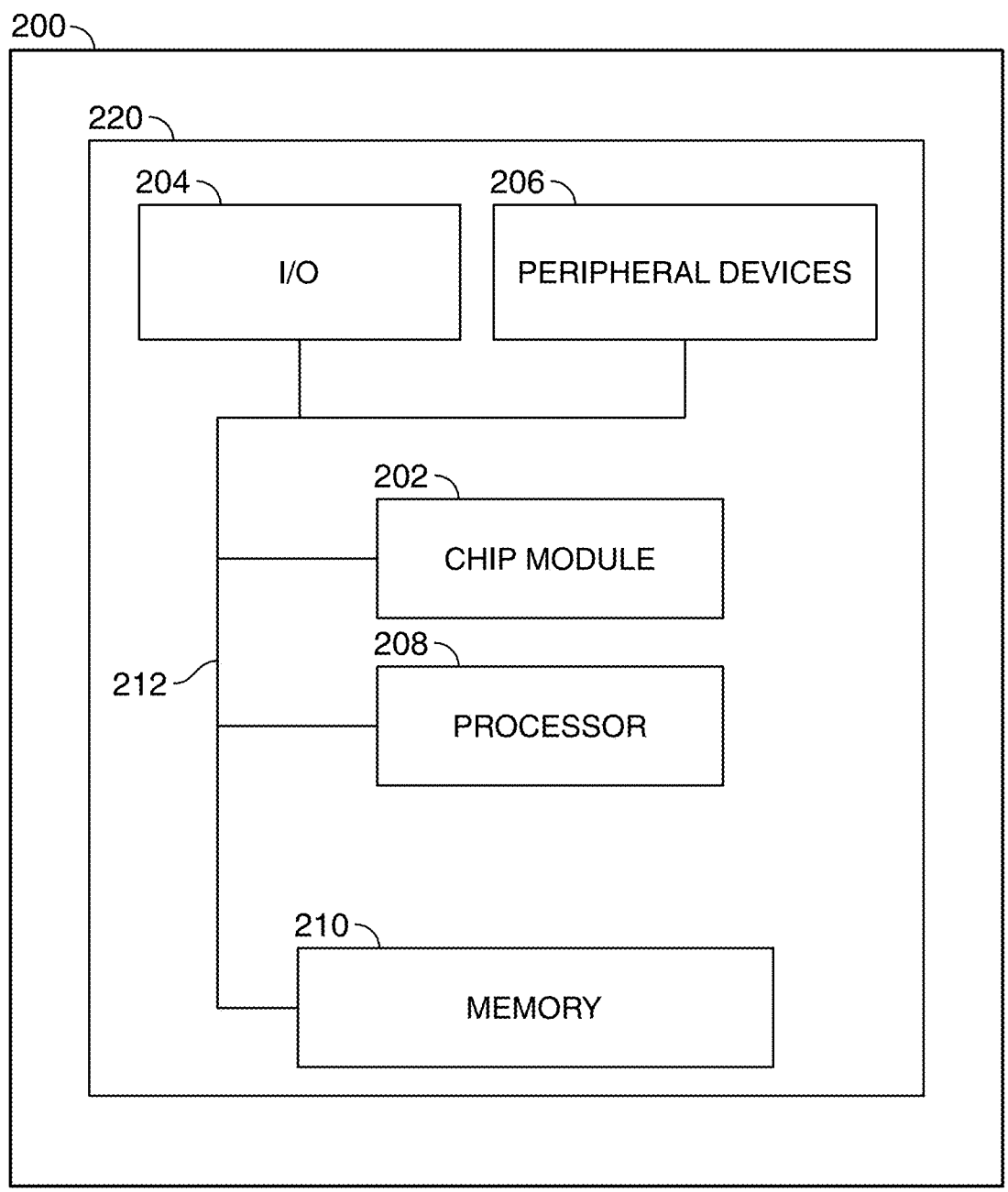
FIG. 2 shows an illustrative apparatus in accordance with principles of the disclosure.

FIG. 2 shows illustrative apparatus 200 that may be configured in accordance with the principles of the disclosure. Apparatus 200 may be a computing machine. Apparatus 200 may include one or more features of the apparatus shown in FIG. 1. Apparatus 200 may include chip module 202, which may include one or more integrated circuits, and which may include logic configured to perform any other suitable logical operations.

Apparatus 200 may include one or more of the following components: I/O circuitry 204, which may include a transmitter device and a receiver device and may interface with fiber optic cable, coaxial cable, telephone lines, wireless devices, PHY layer hardware, a keypad/display control device or any other suitable media or devices; peripheral devices 206, which may include counter timers, real-time timers, power-on reset generators or any other suitable peripheral devices; logical processing device 208, which may compute data structural information and structural parameters of the data; and machine-readable memory 210.

Machine-readable memory 210 may be configured to store in machine-readable data structures: machine executable instructions (which may be alternatively referred to herein as "computer instructions" or "computer code"), applications, signals, and/or any other suitable information or data structures.

Components 202, 204, 206, 208 and 210 may be coupled together by a system bus or other interconnections 212 and may be present on one or more circuit boards such as 220. In some embodiments, the components may be integrated into a single chip. The chip may be silicon-based.

Figure 3:
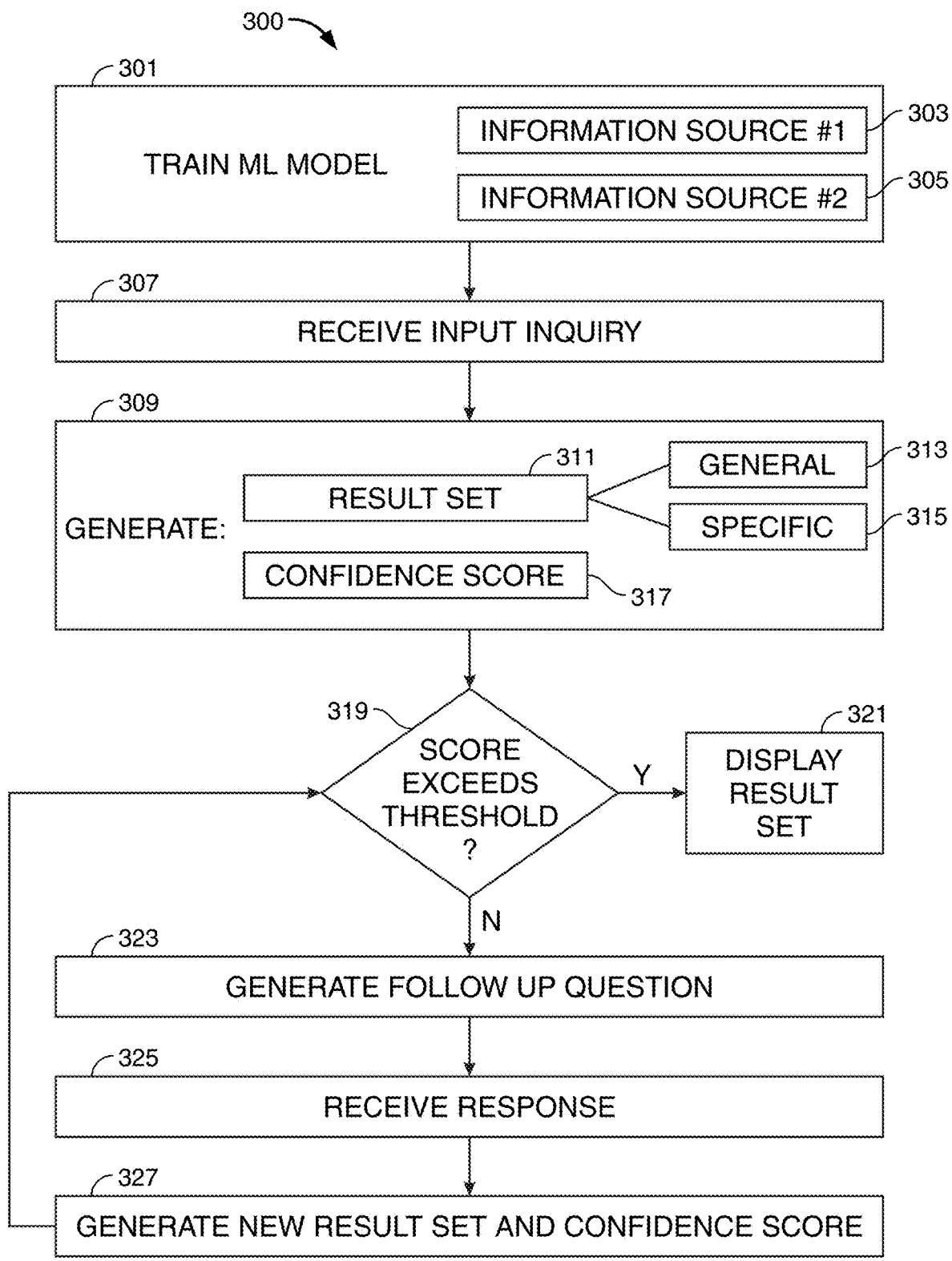
FIG. 3 shows an illustrative flowchart in accordance with principles of the disclosure.

FIG. 3 shows illustrative flowchart 300 in accordance with principles of the disclosure. Step 301 includes training an ML model. The training may involve inputs from separate information sources 303 and 305. Separate information sources 303 and 305 may include a general information resource and a user-specific information resource.

Step 307 includes receiving an input inquiry. The input inquiry may be received at a remote user device. The input inquiry may be received via an integrated search/help icon.

The input inquiry may be a conversational input that may include text-based and/or voice-based chatbot inputs. The system may use a natural language processing (NLP) engine to process the input. The NLP engine may be custom trained based on historical inputs to previously separate "help" and "search" tools of the entity hosting the system.

Step 309 may include generating result set 311 and confidence score 317. Result set 311 may include at least one general result 313 and at least one user-specific result 315. As an illustrative example, the inquiry may be "send an international wire." The result set may then include a general result (e.g., a blurb of text or a link to an article) that sets forth steps to send an international wire. The result set may also include a specific result that may include actual account balances of the user and directions, or an actual link, for the user to execute such an operation.

Step 319 queries whether confidence score 317 exceeds a predetermined threshold. If yes, the system may proceed to step 321 and display result set 311 on a display of the remote user device. If confidence score 317 fails to exceed the predetermined threshold, the system may proceed to step 323 and generate a follow-up question. A response may be received via the user device at step 325.

Step 327 includes generating a new result set and confidence score. The process may then feed back into the query of step 319, and proceed from there as above. The process may, in some embodiments, be repeated until step 321 is reached. In some embodiments, a predetermined limit of follow-up responses may be set, and after reaching that limit the system may display the result set with the highest confidence score. The system may also or alternatively display an error message at that point.

Figure 4:
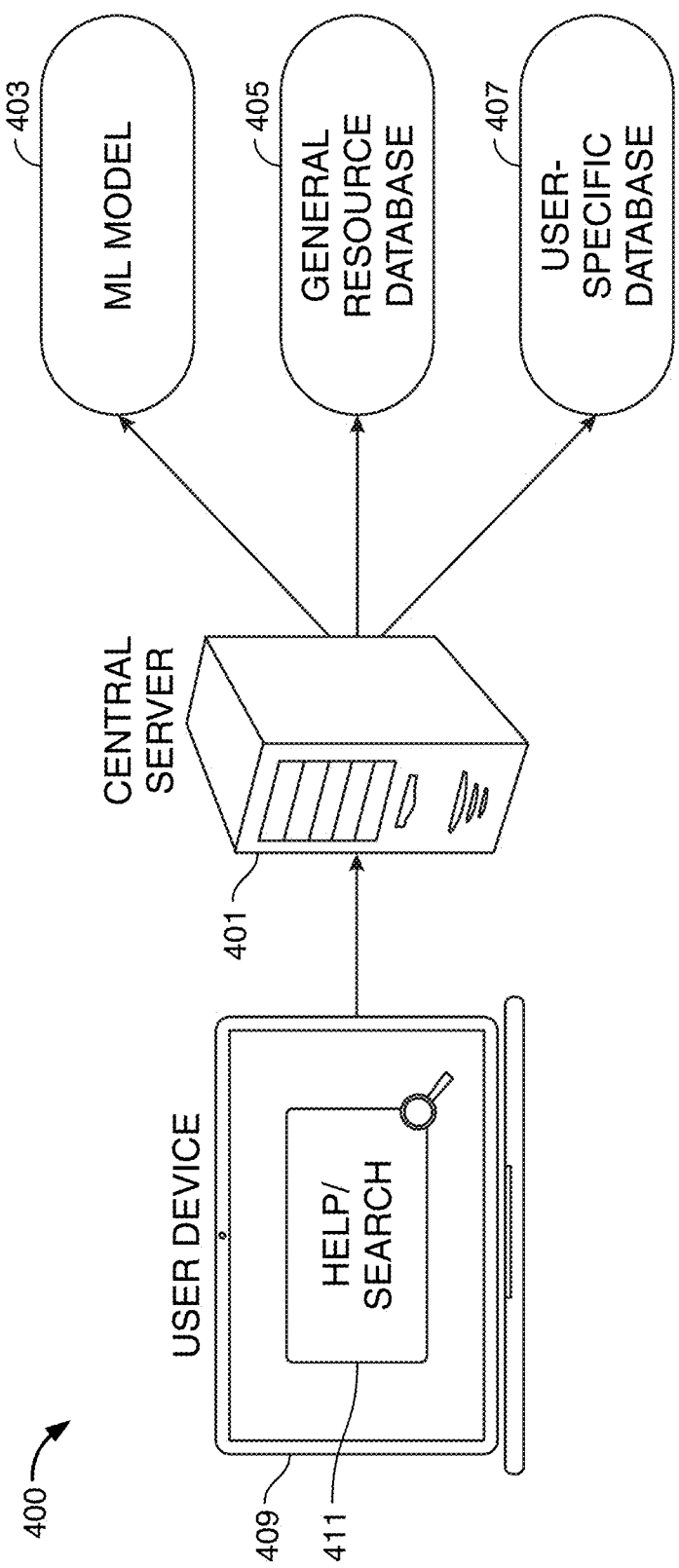
FIG. 4 shows an illustrative diagram in accordance with principles of the disclosure.

FIG. 4 shows illustrative diagram 400 in accordance with principles of the disclosure. Diagram 400 shows central server 401. Central server 401 may include a processor and computer instructions that execute steps of the disclosed method and/or implement aspects of the disclosed system.

The system may include ML model 403. ML model 403 may be trained to associate inquiry keywords with inquiry results. The training may utilize historical data from multiple information resources, including general resource database 405 and user-specific database 407.

The system may include integrated help/search icon 411 on a display of remote user device 409. The integrated help/search icon 411 may be configured to receive input inquiries that previously may have been received through separate "help" and "search" icons. Having separate "help" and "search" icons may be inefficient and confusing for users of the system. Providing integrated help/search icon 411, which may be configured to provide both general results and user-specific results in one consolidated conversational utility, may therefore increase efficiency in the system and provide a more streamlined user experience.

Figure 5:
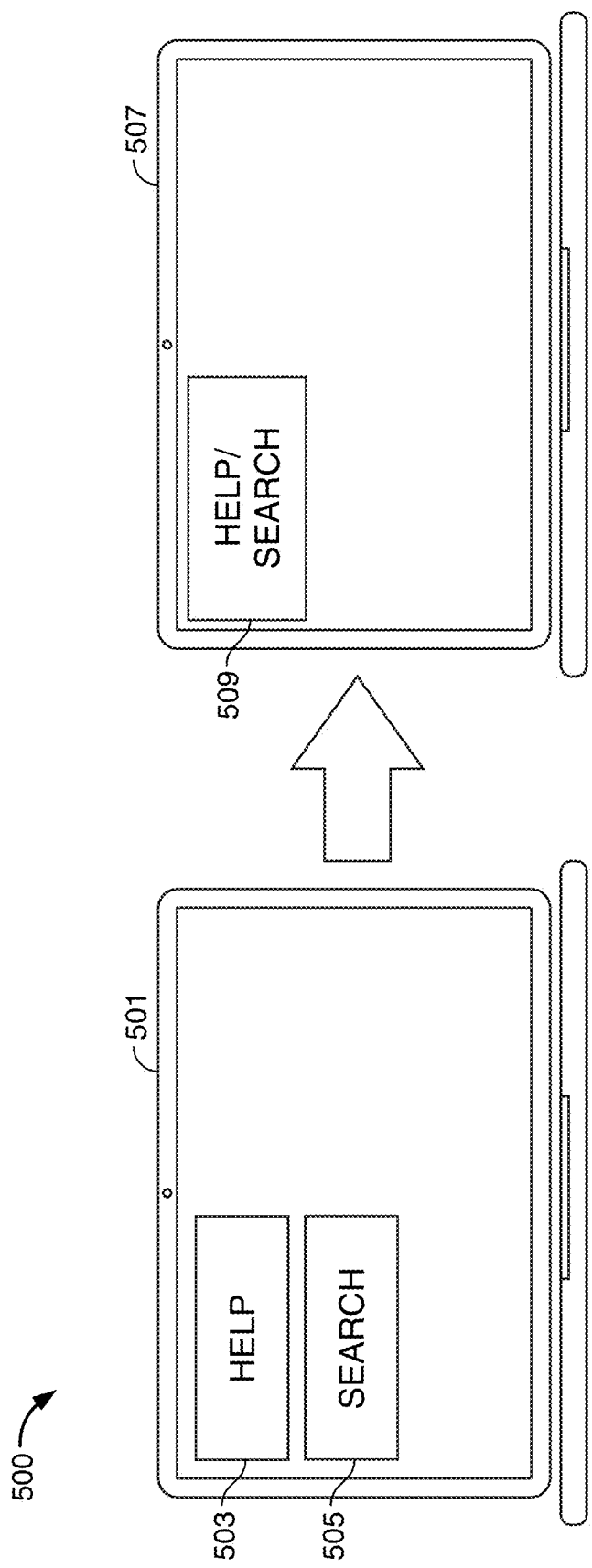
FIG. 5 shows another illustrative diagram in accordance with principles of the disclosure.

FIG. 5 shows illustrative diagram 500 in accordance with principles of the disclosure. Diagram 500 shows device 501 with separate "help" and "search" icons 503 and 505, respectively. Diagram 500 shows device 507 with an improved conversational utility according to aspects of the disclosure, that includes integrated help/search icon 509.

The steps of methods may be performed in an order other than the order shown and/or described herein. Embodiments may omit steps shown and/or described in connection with illustrative methods. Embodiments may include steps that are neither shown nor described in connection with illustrative methods.

Illustrative method steps may be combined. For example, an illustrative method may include steps shown in connection with another illustrative method.

Apparatus may omit features shown and/or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

The drawings show illustrative features of apparatus and methods in accordance with the principles of the invention. The features are illustrated in the context of selected embodiments. It will be understood that features shown in connection with one of the embodiments may be practiced in accordance with the principles of the invention along with features shown in connection with another of the embodiments.

One of ordinary skill in the art will appreciate that the steps shown and described herein may be performed in other than the recited order and that one or more steps illustrated may be optional. The methods of the above-referenced embodiments may involve the use of any suitable elements, steps, computer-executable instructions, or computer-readable data structures. In this regard, other embodiments are disclosed herein as well that can be partially or wholly implemented on a computer-readable medium, for example, by storing computer-executable instructions or modules or by utilizing computer-readable data structures.

Thus, methods and systems for an integrated multi-channel conversational utility are provided. Persons skilled in the art will appreciate that the present invention can be practiced by other than the described embodiments, which are presented for purposes of illustration rather than of limitation, and that the present invention is limited only by the claims that follow.

What is claimed is:

1. An integrated, multi-channel, conversational utility, said utility comprising a processor and computer-executed instructions that, when run on the processor, are configured to:
    train a machine-learning (ML) model to associate input keywords with a set of result options, wherein:
        said set of result options comprises results across at least two separate information sources housed within an entity hosting the utility; and
        the at least two separate information sources comprise a general information center and a user-specific information center;
    provide a single search icon on a display of a remote device of a user accessing an online portal of the entity;
    receive, via the single search icon, a conversational input inquiry;
    generate, via the ML model:
        a first set of results comprising at least one general information resource result and at least one user-specific information result; and
        a confidence score of a relevance of the first set of results to the input inquiry;
    when the confidence score exceeds a predetermined threshold score, display the first set of results on the display of the remote device as a response to the input inquiry; and
    when the confidence score fails to exceed the predetermined threshold score:

generate, via the ML model, a conversational follow-up question designed to clarify an intent of the input inquiry;

display the follow-up question on the display of the remote device;

receive a conversational input response to the follow-up question;

generate, via the ML model, and based on the input inquiry and the input response:
- a second set of results comprising at least one general information resource result and at least one user-specific information result; and
- a second confidence score of a relevance of the second set of results to the input inquiry; and when the second confidence score exceeds the predetermined threshold score, display the second set of results on the display of the remote device as the response to the input inquiry.

2. The utility of claim 1 wherein, when the second confidence score fails to exceed the predetermined threshold score, the utility is configured to repeatedly generate follow-up questions and receive input responses until a set of results is generated with a confidence score that exceeds the predetermined threshold score.

3. The utility of claim 1 wherein the ML model is configured to generate the sets of results based on the conversational input inquiry and also based on contextual information.

4. The utility of claim 3 wherein the contextual information comprises historical inquiries of the user, current and former user activity in the portal, biographical information of the user, and real time current events accessed from an online source.

5. The utility of claim 1 wherein the conversational input inquiry is text-based.

6. The utility of claim 1 wherein the conversational input inquiry is voice-based.

7. The utility of claim 1 wherein the response to the input inquiry is automatically displayed on the display of the remote device in an optimized format based on a type of information included in the response.

8. The utility of claim 7 wherein the optimized format is selected from a list of formats comprising at least tables, text, video, audio, and images.

9. The utility of claim 1 further configured to generate and display on the display of the remote device typeahead suggestions upon receiving partial textual input at the remote device prior to submission of the input inquiry, said typeahead suggestions which are designed to clarify the intent of the input inquiry.

10. The utility of claim 1 wherein:
the single search icon is displayed on the display of the remote device before and after the user achieves authenticated access to the online portal;
the utility is configured to generate and display the set of results comprising at least one general information resource result and at least one user-specific information result only after the user achieves authenticated access to the online portal; and
before the user achieves authenticated access, the utility is configured to generate and display only general information resource results without any user-specific information results.

11. A method for providing an integrated, multi-channel, conversational utility, the method comprising:
training a machine-learning (ML) model to associate input keywords with a set of result options, wherein:
said set of result options comprises results across at least two separate information sources housed within an entity hosting the utility; and
the at least two separate information sources comprise a general information center and a user-specific information center;

providing a single search icon on a display of a remote device of a user accessing an online portal of the entity;

receiving, via the single search icon, a conversational input inquiry;

generating, via the ML model:
- a first set of results comprising at least one general information resource result and at least one user-specific information result; and
- a confidence score of a relevance of the first set of results to the input inquiry;

when the confidence score exceeds a predetermined threshold score, displaying the first set of results on the display of the remote device as a response to the input inquiry; and when the confidence score fails to exceed the predetermined threshold score:
generating, via the ML model, a conversational follow-up question designed to clarify an intent of the input inquiry;
displaying the follow-up question on the display of the remote device;
receiving a conversational input response to the follow-up question;
generating, via the ML model, and based on the input inquiry and the input response:
- a second set of results comprising at least one general information resource result and at least one user-specific information result; and
- a second confidence score of a relevance of the second set of results to the input inquiry; and
when the second confidence score exceeds the predetermined threshold score, displaying the second set of results on the display of the remote device as the response to the input inquiry.

12. The method of claim 11 further comprising, when the second confidence score fails to exceed the predetermined threshold score, repeatedly generating follow-up questions and receiving input responses until a set of results is generated with a confidence score that exceeds the predetermined threshold score.

13. The method of claim 11 further comprising generating, via the ML model, the sets of results based on the conversational input inquiry and also based on contextual information.

14. The method of claim 13 wherein the contextual information comprises historical inquiries of the user, current and former user activity in the portal, biographical information of the user, and real time current events accessed from an online source.

15. The method of claim 11 wherein the conversational input inquiry is text-based.

16. The method of claim 11 wherein the conversational input inquiry is voice-based.

17. The method of claim 11 further comprising automatically displaying the response to the input inquiry on the display of the remote device in an optimized format based on a type of information included in the response.

18. The method of claim 17 wherein the optimized format is selected from a list of formats comprising at least tables, text, video, audio, and images.

19. The method of claim 11 further comprising generating and displaying on the display of the remote device typeahead suggestions upon receiving partial textual input at the remote device prior to submission of the input inquiry, said typeahead suggestions which are designed to clarify the intent of the input inquiry.

20. The method of claim 11 further comprising:
- displaying the single search icon on the display of the remote device before and after the user achieves authenticated access to the online portal;
- generating and displaying the set of results comprising at least one general information resource result and at least one user-specific information result only after the user achieves authenticated access to the online portal; and
- before the user achieves authenticated access, generating and displaying only general information resource results without any user-specific information results.

\* \* \* \* \*